United States Patent
Hammond et al.

(10) Patent No.: US 10,605,370 B2
(45) Date of Patent: Mar. 31, 2020

(54) VALVE TRIM APPARATUS FOR USE WITH CONTROL VALVES

(71) Applicant: Fisher Controls International LLC, Marshalltown, IA (US)

(72) Inventors: Christopher James Hammond, Marshalltown, IA (US); Michael Donald Stinn, State Center, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 79 days.

(21) Appl. No.: 15/863,436

(22) Filed: Jan. 5, 2018

(65) Prior Publication Data
US 2019/0211934 A1 Jul. 11, 2019

(51) Int. Cl.
F16K 1/52 (2006.01)
F16K 21/02 (2006.01)
F16K 47/08 (2006.01)
F16K 3/24 (2006.01)

(52) U.S. Cl.
CPC ............... *F16K 1/52* (2013.01); *F16K 3/246* (2013.01); *F16K 21/02* (2013.01); *F16K 47/08* (2013.01)

(58) Field of Classification Search
CPC ....... Y10T 137/7847; Y10T 137/86734; Y10T 137/86751; Y10T 137/87386; F16K 1/52; F16K 21/02; F16K 47/08; F16K 3/24
USPC .............................................. 138/43, 45, 46
See application file for complete search history.

(56) References Cited

U.S. PATENT DOCUMENTS

| | | | | |
|---|---|---|---|---|
| 3,152,617 A | * | 10/1964 | Justus | F16K 25/04 137/625.5 |
| 4,258,750 A | * | 3/1981 | Schnall | F16K 47/045 137/625.3 |
| 4,356,837 A | * | 11/1982 | Dickinson | F02B 77/04 134/166 C |
| 4,375,821 A | * | 3/1983 | Nanao | F16K 3/26 137/239 |
| 4,397,331 A | | 8/1983 | Medlar | |
| 4,567,915 A | * | 2/1986 | Bates | F16K 47/08 137/625.3 |

(Continued)

FOREIGN PATENT DOCUMENTS

JP        S6199784        5/1986

OTHER PUBLICATIONS

Fisher Severe Services, "Fisher Cavitation-Control Technologies Solutions to Cavitation Problems," brochure dated Apr. 2011, 20 pages.

(Continued)

*Primary Examiner* — Jessica Cahill
(74) *Attorney, Agent, or Firm* — Hanley, Flight & Zimmerman, LLC

(57) ABSTRACT

Valve trim apparatus for use with fluid valves are disclosed. An example valve trim apparatus includes a cage to be positioned in a fluid flow passageway of a valve body. The cage has a cage body defining a first end and a second end opposite the first end. The cage has an opening extending through the body between the first end and the second end. A valve seat is positioned in the opening of the cage body between the first end and the second end of the cage body. The valve trim apparatus is to allow fluid flow between the inlet and the outlet when the fluid valve is in a closed position.

20 Claims, 4 Drawing Sheets

(56) References Cited

U.S. PATENT DOCUMENTS

| | | | | |
|---|---|---|---|---|
| 5,323,773 | A * | 6/1994 | Kobayashi | A62B 9/02 128/205.24 |
| 5,964,248 | A * | 10/1999 | Enarson | F01D 17/143 137/625.37 |
| 5,971,604 | A * | 10/1999 | Linga | B01F 15/0429 137/625.3 |
| 6,394,134 | B1 * | 5/2002 | Kwon | F16K 47/08 137/625.3 |
| 6,789,567 | B2 * | 9/2004 | Meyer | F16K 15/142 137/269.5 |
| 7,320,340 | B2 * | 1/2008 | Bush | F16K 47/10 138/42 |
| 8,033,300 | B2 * | 10/2011 | McCarty | F16K 47/08 138/42 |
| 8,348,227 | B2 * | 1/2013 | Zoller | G05D 7/0133 251/120 |
| 8,490,651 | B2 * | 7/2013 | Cheng | F16K 47/08 137/625.3 |
| 8,869,832 | B2 * | 10/2014 | Baumann | F16K 47/08 137/625.33 |
| 10,100,604 | B2 * | 10/2018 | Hopper | F16K 25/04 |
| 2003/0226600 | A1 * | 12/2003 | Stares | F16K 47/08 137/625.3 |
| 2005/0034770 | A1 * | 2/2005 | Stares | F16K 3/246 137/625.3 |
| 2009/0026395 | A1 | 1/2009 | Perrault et al. | |
| 2017/0009907 | A1 | 1/2017 | Nitta | |

OTHER PUBLICATIONS

International Searching Authority, "International Search Report," issued in connection with International Patent Application No. PCT/US2019/012261, dated Apr. 10, 2019, 5 pages.

International Searching Authority, "Written Opinion," issued in connection with International Patent Application No. PCT/US2019/012261, dated Apr. 10, 2019, 7 pages.

* cited by examiner

VALVE TRIM APPARATUS FOR USE WITH CONTROL VALVES

FIELD OF THE DISCLOSURE

This disclosure relates generally to process control systems and, more particularly, to valve trim apparatus for use with control valves.

BACKGROUND

Operating process units and/or systems like those used in the oil and gas production industry, refining, petrochemical and other manufacturing facilities typically include significant equipment assets, such as pumps. The condition, health, integrity, and/or performance of such pumps are essential to the efficiency and/or safety of processing plants.

SUMMARY

An example valve trim apparatus includes a cage to be positioned in a fluid flow passageway of a valve body. The cage has a cage body defining a first end and a second end opposite the first end. The cage has an opening extending through the body between the first end and the second end. A valve seat is positioned in the opening of the cage body between the first end and the second end of the cage body. The valve trim apparatus is to allow fluid flow between the inlet and the outlet when the fluid valve is in a closed position.

An example valve includes a valve body defining a fluid flow passageway between an inlet and an outlet, where the fluid flow passageway defines an orifice. A cage is positioned in the fluid flow passageway. The cage has a cage body defining an opening and a valve seat positioned in the opening between a first end of the cage body and a second end of the cage body opposite the first end. A valve plug is movably coupled relative to the cage body. The opening of the cage body to receive the valve plug when the valve plug moves between an open position at which the valve plug is spaced away from the valve seat and a closed position at which the valve plug is in sealing engagement with the valve seat. The valve plug is to modulate fluid flow through the fluid flow passageway when the valve plug moves between the open position and the closed position, and the cage is to allow fluid flow between the inlet and the outlet when the valve plug is in sealing engagement with the valve seat.

An example valve includes means for defining a fluid flow passageway between an inlet and an outlet. The valve includes means for providing a valve seat positioned in the fluid flow passageway between the inlet and the outlet. The valve includes means for modulating fluid flow between the inlet and the outlet, where the means for modulating fluid flow to move between an open position and a closed position relative to the means for providing the valve seat. The valve includes means for allowing fluid flow between the inlet and the outlet when the means for modulating fluid flow is in the closed position.

DETAILED DESCRIPTION

Figure 1:
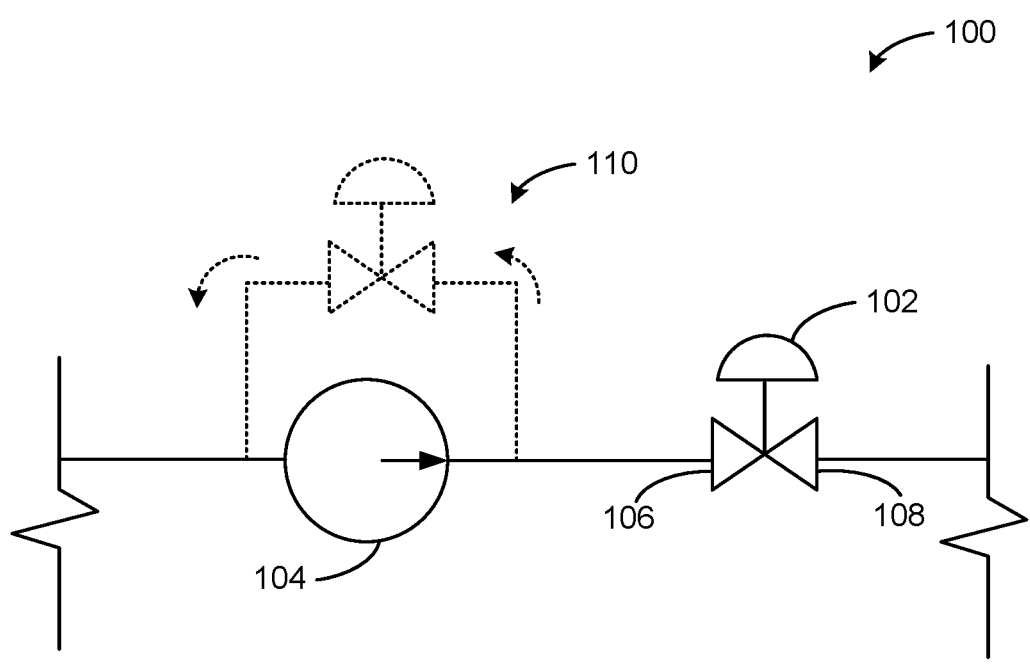
FIG. 1 is a schematic illustration of an operating process including an example control valve implemented with an example valve trim apparatus in accordance with teachings of this disclosure.

Cavitation is one of the leading causes of pump failure. Cavitation occurs in pumps (e.g., centrifugal pumps) when there is insufficient pressure within the pump casing to maintain a fluid in a liquid state and/or when a liquid is subjected to rapid changes of pressure that cause the formation of cavities in the liquid where the pressure is relatively low. When the fluid within a pump is unable to maintain a liquid state, vapor pockets and/or small bodies of gas contained in the liquid (e.g., bubbles) form within the pump. For example, the vapor pockets implode and can generate an intense shock wave when subjected to high pressures, which can eventually cause damage to components of the pump. For example, cavitation may erode material from the impeller, wear the pump housing and/or seal, and/or cause pumps seals to leak. Such damage to components of the pump may result in a failure of the pump.

Cavitation may be caused by continued operation of the pump below a particular flow rate (e.g., a minimum flow rate). Thus, to protect an upstream pump from cavitation and/or overheating, liquid pumps require a continuous (e.g., minimum) flow rate. To provide a continuous flow rate, some example process systems employ a separate recirculation pipeline. The recirculation pipeline provides fluid to an inlet of the pump from an exit of the pump. Thus, when downstream demand decreases, the recirculation pipeline enables the pump to provide a continuous flow rate to reduce or prevent cavitation and/or overheating. However, the recirculation pipeline increases costs and maintenance. In some instances, space restrictions prevent installation of the recirculation pipeline.

To eliminate the recirculation pipeline, some known process systems employ a rotary valve (e.g., a butterfly control valve) having a disk or flow control member that includes apertures (e.g., holes milled into the disk) to support a continuous minimum flow rate through a pump positioned upstream from the rotary valve. For example, when downstream demand decreases, the rotary valve may be positioned to a closed position. However, the apertures enable a certain amount of fluid flow between an inlet and an outlet (e.g., through the disk) of the rotary valve to provide a continuous (e.g., minimum) flow rate through the control valve to prevent cavitation in the upstream pump. Although such known rotary valves are effective for preventing cavitation in the pump, such known rotary valves have limited pressure drop capability or characteristics. As a result, such known rotary valves cannot be used with high pressure applications due to concerns with high pressure liquid cavitation. For example, cavitation may decrease flow capability through the control valve (e.g., choked flow), may cause material damage to a valve trim, a valve body, and/or pipeline, and/or may cause excessive noise and/or vibration. Thus, such rotary valves are effective for low pressure drop applications (e.g., pressure drops of less than 50 psi).

Example valve trim apparatus disclosed herein may be used with control valves. Specifically, example valve trim apparatus disclosed herein enable control valves to provide continuous flow characteristics for pump systems. For example, fluid control valves disclosed herein employ example valve trim apparatus that provide continuous (e.g., a minimum) flow rate to prevent overheating and/or cavitation damage to an upstream pump. Specifically, example valve trim apparatus disclosed herein eliminate the need for a typical recirculation pipeline. Additionally, example fluid control valves implemented with example valve trim apparatus disclosed herein may be employed in relatively high pressure drop applications (e.g., pressure drops of 3,000 psi). Such high pressure drop characteristics may be provided by a cage (e.g., a multi-stage pressure reducing cage) of the valve trim apparatus disclosed herein. Thus, example fluid control valves implemented with example valve trim apparatus disclosed herein may reduce a potential for high pressure liquid cavitation. To provide a continuous (e.g., minimum) flow rate for the upstream pump and/or reduce high pressure liquid cavitation, example valve trim apparatus disclosed herein employ a cage having a valve seat positioned between a first end and a second end of the cage. Specifically, the cage and the valve seat enable fluid flow between an inlet and an outlet when a flow control member (e.g., a valve plug) is engaged with the valve seat. In other words, example control valves disclosed herein allow fluid flow (e.g., a desired or predetermined fluid flow rate) when the control valves are in a closed position (e.g., when a valve plug is in engagement with a valve seat).

Additionally, example cages disclosed herein may include one or more apertures to provide desired fluid flow characteristics such as, for example, enhanced pressure recovery, reduction or elimination of noise and/or cavitation, etc. For example, pressure recovery is a flow characteristic of a fluid passageway that indicates an amount and/or percentage of increase in fluid pressure after a preceding decrease in fluid pressure. In examples in which a valve cage may produce a low pressure recovery, fluid pressure downstream from a throat of a passageway may be significantly less than fluid pressure upstream from the throat. Low pressure recoveries and/or reduced fluid pressure may result in other undesired fluid flow characteristics such as, for example, cavitation and/or reduced noise attenuation. For example, if a fluid passageway includes a throat (e.g., a narrowed portion of the fluid passageway between two wider portions of the fluid passageway), the fluid pressure decreases as the fluid approaches the throat and increases as the fluid exits the throat. In such instances, the pressure recovery identifies the increase in fluid pressure from the throat (e.g., a lowest-pressure value) to the subsequent wider portion (e.g., a highest-pressure value downstream from the throat). The desired fluid flow characteristics (e.g., enhanced pressure recovery, reduction of noise and/or cavitation, etc.) are achieved by varying a number and/or a geometry of the apertures.

FIG. 1 is a schematic illustration of an example process control system 100 implemented with an example control valve 102 constructed in accordance with teachings of this disclosure. The process control system 100 of the illustrated example includes a pump 104 fluidly coupled to the control valve 102 positioned downstream from the pump 104. Specifically, when demand downstream from the control valve 102 decreases, the control valve 102 of the illustrated example enables a continuous (e.g., minimum) flow rate for the pump 104 positioned upstream from the control valve 102. Such continuous flow rate reduces and/or eliminates cavitation and/or overheating of the pump 104. Additionally, the control valve 102 of the illustrated example reduces high pressure liquid cavitation that may otherwise result as fluid pressure drops between an inlet 106 and an outlet 108 of the control valve 102. For example, cavitation may occur at a point in a fluid stream where a diameter of the stream is the least, and fluid velocity is at a maximum (e.g., a vena contracta). Thus, the control valve 102 of the illustrated example may be used in high pressure drop applications. Additionally, the control valve 102 of the illustrated example eliminates the need for a recirculation pipeline 110 (e.g., shown in dashed lines in FIG. 1).

Figure 2:
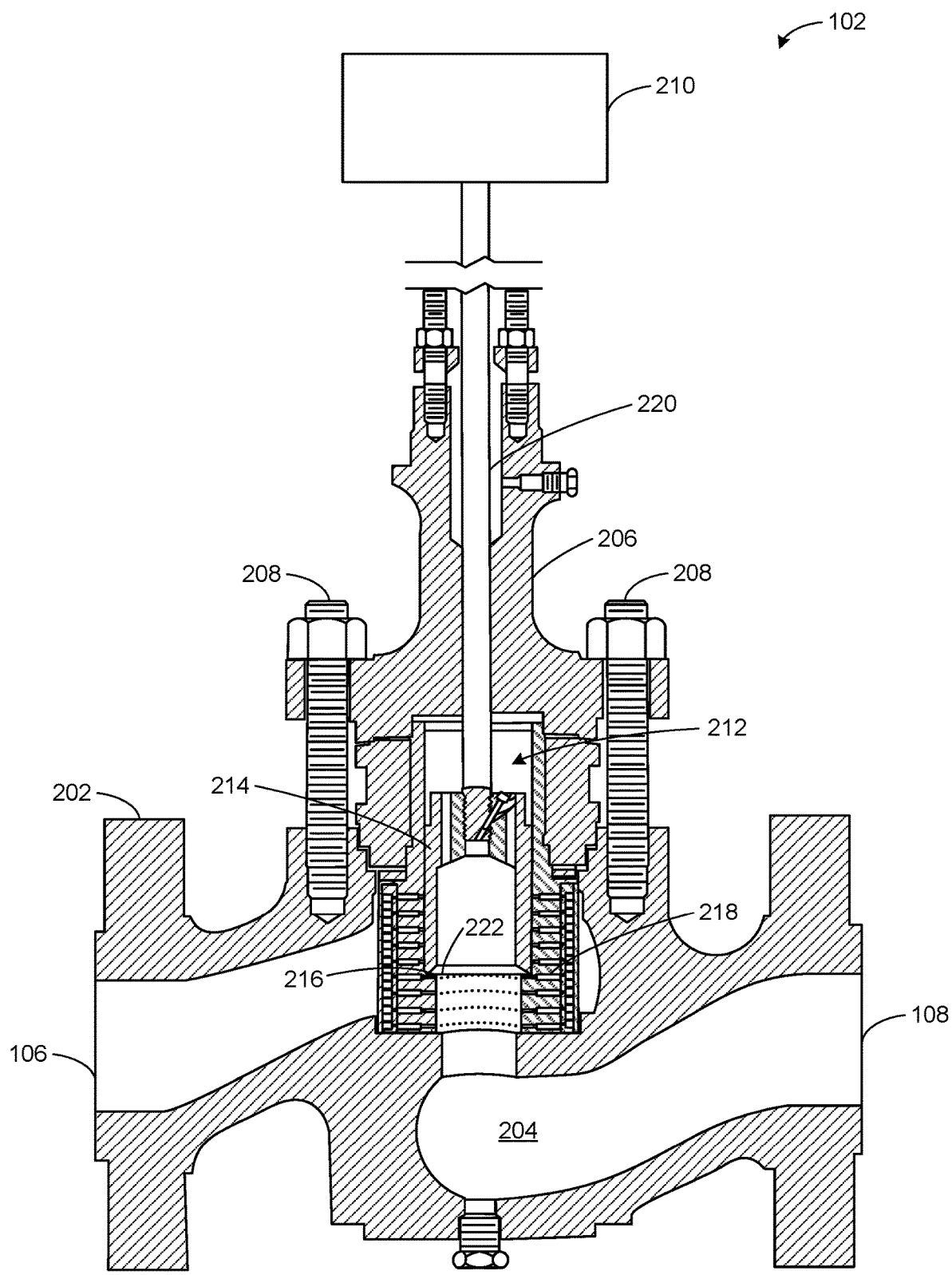
FIG. 2 is a cross-sectional view of the example control valve of FIG. 1.

FIG. 2 is a cross-sectional view of the example control valve 102 of FIG. 1. The control valve 102 of the illustrated example is a sliding stem valve. The control valve 102 of the illustrated example includes a valve body 202 that defines a fluid flow passageway 204 between the inlet 106 and the outlet 108. In some examples, the valve body 202 provides means for defining a fluid flow passageway between the inlet 106 and the outlet 108. A bonnet 206 is coupled to the valve body 202 via fasteners 208 which, in turn, couples the valve body 202 to an actuator 210 (e.g., a pneumatic actuator). Valve trim 212 is disposed within the fluid flow passageway 204 formed via the valve body 202 to control fluid flow between the inlet 106 and the outlet 108. When the bonnet 206 is attached to the valve body 202, the bonnet 206 retains the valve trim within the valve body 202.

The valve trim 212 of the illustrated example includes internal components of the control valve 102 that control fluid flow between the inlet 106 and the outlet 108 and/or provide certain fluid flow characteristics to fluid flowing through the fluid flow passageway 204. The valve trim 212 of the illustrated example includes a closure member 214, a valve seat 216, a cage 218, and a stem 220. For example, the stem 220 of the illustrated example operatively couples the closure member 214 to the actuator 210. In the illustrated example, the closure member 214 is depicted as a valve plug having a cylindrical body and a seating surface 222. However, in other example implementations, the closure member 214 may be a disk, or any other structure (e.g., sliding stem closure member) to vary the flow of fluid through the control valve 102. The closure member 214 (e.g., a valve plug) of the illustrated example has an outer surface sized to closely fit within the cage 218 so that the closure member 214 is movable or slidable within the cage 218 relative to the valve seat 216.

As described in greater detail below, the cage 218 of the illustrated example defines the valve seat 216. Specifically, the cage 218 and the valve seat 216 of the illustrated example are integrally formed as a unitary piece or structure. In some examples, the cage 218 and/or the valve seat 216 define means for providing a valve seat positioned in the fluid flow passageway between the inlet 106 and the outlet 108. The cage 218 can also facilitate maintenance, removal, and/or replacement of the other components of the valve trim 212.

In operation, the actuator 210 (e.g., a pneumatic actuator) drives the closure member 214 between a closed position at which the seating surface 222 of the closure member 214 is in (e.g., sealing) engagement with the valve seat 216 and a fully open or maximum flow rate position at which the seating surface 222 of the closure member 214 is positioned at a distance away from the valve seat 216. Specifically, the closure member 214 of the illustrated example moves relative to the valve seat 216 between a fully closed position and a fully open position to modulate fluid flow through the fluid flow passageway 204 of the valve body 202. Additionally, in the fully closed position, the control valve 102 of the illustrated example allow fluid flow between the inlet 106 and the outlet 108. In other words, the valve trim 212 (e.g., the cage 218, the valve seat 216 and the closure member 214) allows fluid flow between the inlet 106 and the outlet 108 when the closure member 214 (e.g., the seating surface 222) is in (e.g., sealing) engagement with the valve seat 216. Such fluid flow between the inlet 106 and the outlet 108 when the control valve 102 is in the closed position provides a continuous (e.g., a minimum) flow rate to prevent cavitation and/or overheating of the pump 104 upstream from the control valve 102. In some examples, the closure member 214 defines means for modulating fluid flow between the inlet 106 and the outlet 108. In some examples, the cage 218 and the valve seat 216 define means for providing the valve seat. In some examples, the cage 218 and the valve seat 216 define means for means for allowing fluid flow between the inlet 106 and the outlet 108 when the control valve 102 is in the closed position.

Figure 3:
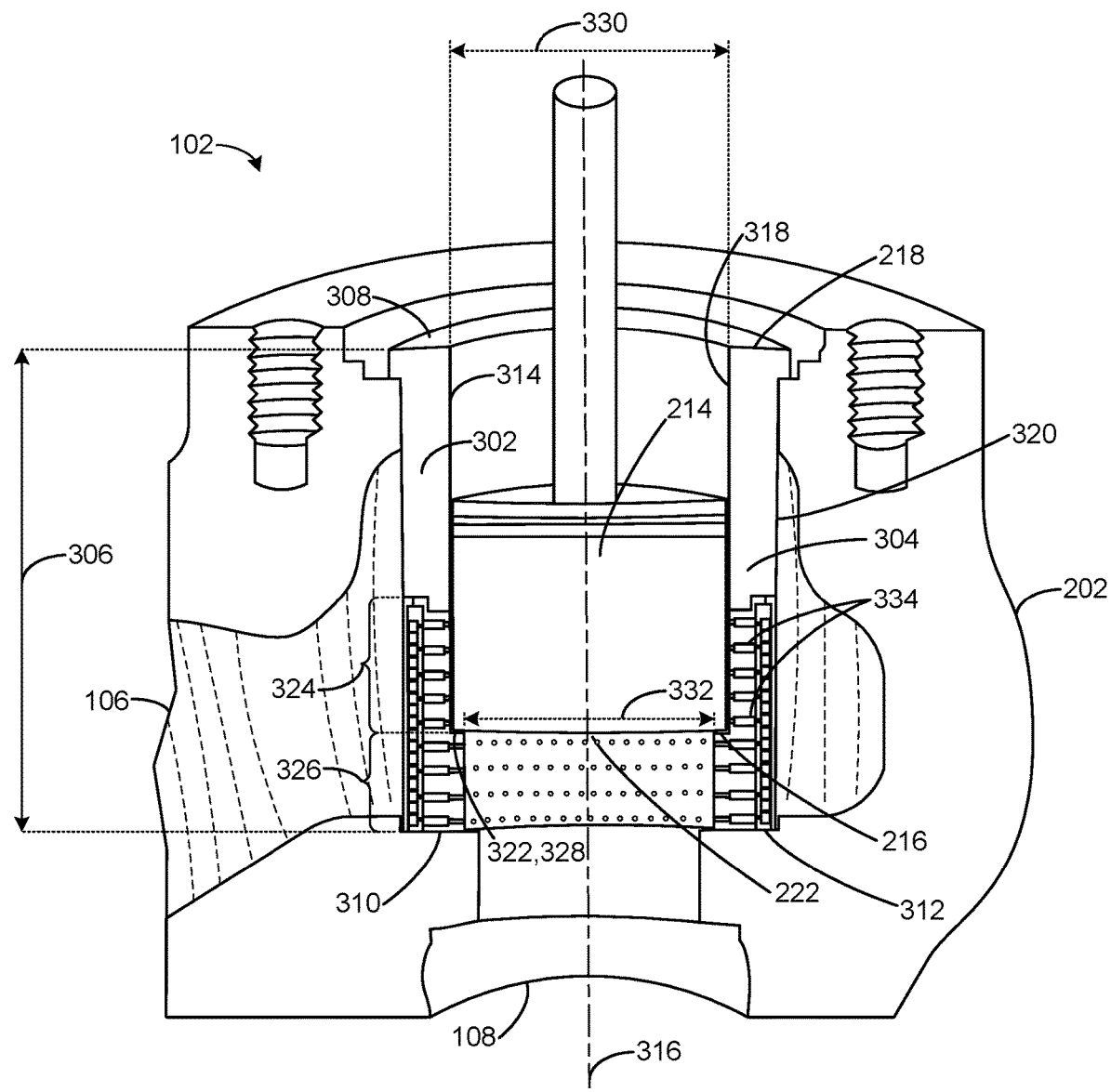
FIG. 3 is a partial, perspective cutaway view of the example valve trim apparatus of FIG. 2.

FIG. 3 is a perspective, cutaway view of the example control valve 102 of FIGS. 1 and 2. The cage 218 of the illustrated example is disposed between the inlet 106 and the outlet 108 to provide certain flow characteristics to a fluid flowing through the fluid flow passageway 204. For example, the cage 218 of the illustrated example reduces noise, vibration and/or reduces or eliminates cavitation generated by a fluid through the control valve 102. Additionally, the cage 218 of the illustrated example guides the closure member 214 and provides lateral stability as the closure member 214 travels between the open position and the closed position relative to the valve seat 216, thereby reducing vibrations and/or other mechanical stress.

The cage 218 of the illustrated example includes a cage body 302. The cage body 302 of the illustrated example is a cylindrically shaped body. However, in other examples, the cage body 302 may have any other shape. The cage body 302 of the illustrated example includes a side wall 304 (e.g., a cylindrical wall) having a longitudinal length 306 defining a first end 308 and a second end 310 opposite the first end 308. The first end 308 of the cage body 302 of the illustrated example is positioned adjacent (e.g., in direct contact with) the bonnet 206 and the second end 310 of the cage body 302 is positioned adjacent (e.g., in direct contact with) the valve body 202 (e.g., a shoulder 312 defined by the valve body 202). In particular, the cage body 302 of the illustrated example includes an opening 314 extending through the cage body 302 along a longitudinal axis 316. The opening 314 of the illustrated example extends between the first end 308 and the second end 310 to define an inner surface 318 (e.g., an interior wall surface) of the side wall 304 or the cage body 302 and an outer surface 320 (e.g., an exterior wall surface) of the side wall 304 or the cage body 302. The outer surface of the closure member 214 is sized to closely fit within the opening 314 of the cage 218.

The valve seat 216 of the illustrated example is positioned or formed in the opening 314 of the cage body 302 between the first end 308 and the second end 310 of the cage 218. The valve seat 216 of the illustrated example forms an annular ring along the inner surface 318 of the cage body 302. To form the valve seat 216, the cage body 302 of the illustrated example includes a stepped surface 322 (e.g., a shoulder or lip) along the inner surface 318 of the cage body 302 at an interface between a first or upper portion 324 (e.g., a first fluid zone) and a second or lower portion 326 (e.g., a second fluid zone) of the cage body 302. The stepped surface 322 of the illustrated example defines a sealing surface 328 to receive the seating surface 222 of the closure member 214. The sealing surface 328 of the illustrated example is oriented substantially non-perpendicular relative to the inner surface 318 of the cage body 302. For example, the sealing surface 328 may be beveled, angled, tilted and/or canted relative to the longitudinal axis 316 and/or the inner surface 318 of the cage body 302. As used herein, the term substantially is used to imply approximately perpendicular and/or perfectly perpendicular. In some examples, the sealing surface 328 may include a groove (e.g., an annular groove) to receive (e.g., matably receive) a seating surface (e.g., a knife-shaped seating surface) of a closure member. In some examples, the sealing surface 328 may have any other shape or profile to engage and/or receive (e.g., matably and/or sealingly receive) a seating surface of a closure member.

The valve seat 216 is to be located at a position along the longitudinal length 306 that enables fluid flow between the inlet 106 and the outlet 108 when the closure member 214 is in (e.g. sealingly) engagement with the valve seat 216 (i.e., when the control valve 102 is in the closed position). For example, the valve seat 216 may be positioned at any point along the longitudinal length 306 of the cage body 302 between the first end 308 and the second end 310. In the illustrated example, the valve seat 216 may be positioned adjacent a midpoint between the first portion 324 and the second portion 326. In some examples, the valve seat 216 is formed or located at a position that is closer to the second end 310 of the cage 218. In some such examples, the valve seat 216 may be positioned adjacent the second end 310 of the cage body 302 such that only one or two rows of apertures 334 are exposed or in fluid communication between the inlet 106 and the outlet 108 when the control valve 102 is in the closed position.

To define the valve seat 216 (e.g., the stepped surface 322), the opening 314 along the first portion 324 of the cage body 302 of the illustrated example includes a first dimensional characteristic 330 and the opening 314 along the second portion 326 of the illustrated example includes a second dimensional characteristic 332 different than the first dimensional characteristic 330. For example, the first dimensional characteristic 330 is a first diameter and the second dimensional characteristic 332 is a second diameter different than the first diameter. For example, to form the opening 314 along the second portion 326, a first bore is formed through the cage body 302 in a direction along the longitudinal axis 316 to define the second dimensional characteristic 332 (e.g., the second diameter). To form the opening 314 along the first portion 324, a second bore (e.g. counterbore) is formed through the first portion 324 of the cage body 302 in a direction along the longitudinal axis 316 to define the first dimensional characteristic 330 (e.g., the first diameter).

The cage 218 of the illustrated example includes the apertures 334 (e.g., holes or slots) positioned between the first end 308 and the second end 310 of the cage body 302. Specifically, the cage 218 the illustrated example includes one or more apertures 334 that extend through the side wall 304 of the cage body 302 to provide fluid communication between the inner surface 318 and the outer surface 320. In other words, the apertures 334 enable fluid flow between the outer surface 320 and the inner surface 318 of the side wall 304. Each of the apertures 334 of the illustrated example has a longitudinal axis that is non-parallel (e.g., perpendicular and/or or canted) relative to the longitudinal axis 316 of the opening 314. The apertures 334 of the illustrated example may include one or more standard, anti-cavitation, and/or pressure staged apertures. For example, the first portion 324 and/or the second portion 326 of the cage 218 of the illustrated example may include apertures 334 having various shapes, sizes, and/or spacing to control fluid flow and/or reduce or eliminate cavitation, and/or noise through the control valve 102.

The first portion 324 of the cage 218 of the illustrated example defines a throttling area and the second portion 326 of the cage 218 of the illustrated example defines a pump flow area. Specifically, the first portion 324 (e.g., the throttling area) is positioned upstream from the valve seat 216 and the second portion (e.g., the pump flow area) is positioned downstream from the valve seat 216 in the orientation of FIG. 3. The first portion 324 of the illustrated example provides throttling flow requirements using either a standard, anti-cavitation, and/or pressure staged apertures. Similarly, the second portion 326 of the illustrated example includes one or more standard, anti-cavitation, and/or pressure staged apertures to meet certain pump flow requirement(s).

For example, the closure member 214 moves between the valve seat 216 and the first end 308 of the cage 218 to allow and prevent fluid flow through the apertures 334 of the first portion 324 of the cage 218 to modulate fluid flow through the fluid flow passageway 204. For example, in the closed position, the closure member 214 of the illustrated example blocks or prevents fluid flow through the apertures 334 of the first portion 324 of the cage 218. Additionally, although the closure member 214 blocks fluid flow through the apertures 334 of the first portion 324 of the cage 218 when the closure member 214 is in the closed position (e.g., in engagement with the valve seat 216), the apertures 334 of the second portion 326 of the illustrated example allow fluid flow between the inlet 106 and the outlet 108 when the closure member 214 is sealingly engaged with the valve seat 216 to provide a continuous (e.g., minimum) flow rate for the pump 104. Specifically, the apertures 334 of the second portion 326 of the cage body 302 are in fluid communication with the inlet 106 and the outlet 108 of the fluid flow passageway 204 when the closure member 214 is in engagement with the valve seat 216. Thus, the apertures 334 fluidly couple the inlet 106 and the outlet 108 when the closure member 214 is in the closed position relative to the valve seat 216 because the apertures 334 of the second portion 326 are positioned downstream from the valve seat 216. In other words, when the closure member 214 is engaged with the valve seat 216, fluid at the inlet 106 of the fluid flow passageway 204 can flow or travel to the outlet 108 via the apertures 334 of the second portion 326 of the cage body 302. The flow rate to be provided by the apertures 334 of the second portion 326 of the cage 218 may be configured to meet flow characteristics of the pump 104 such as, for example, a minimum flow to prevent cavitation. In some examples, the second portion 326 may include fewer apertures or more apertures to provide a flow rate based on the minimum flow characteristic of the pump 104. In some examples, the second portion 326 of the cage 218 provides means for allowing fluid flow between the inlet 106 and the outlet 108 when the means for modulating fluid flow (e.g., the closure member 214) is in the closed position. In some examples, the one or more apertures 334 of the first portion 324 and/or the second portion 326 of the cage 218 provide means for reducing cavitation and/or means for attenuating noise.

The cage 218 of the illustrated example includes the apertures 334 (e.g., fluid flow passages) that are shaped to increase the pressure recovery produced by the cage 218 as fluid flows from the inlet 106 to the outlet 108 of the control valve 102. The apertures 334 of the cage 218 of the illustrated example are not limited to the apertures 334 of the first portion 324 and the second portion 326. In some examples, the cage 218 of the illustrated example may include various designs to provide certain fluid flow characteristics to suit the needs of a particular control application. For example, the cage 218 may be configured to provide particular, desirable fluid flow versus pressure drop characteristics. For example, the apertures 334 of the first portion 324 and/or the second portion 326 may include any number and/or geometry to provide certain fluid flow characteristics. In some examples, the first portion 324 (e.g., the throttling portion) and/or the second portion 326 (e.g., the continuous fluid flow portion) may include a single aperture. In some example, the apertures 334 may be arranged along a helically-shaped path or pattern on the cage 218. In some examples, the helically-arranged apertures of the cage 218 produce a constant pressure recovery and/or a predictable (e.g., linear, exponential, etc.) rate of change of flow capacity as the closure member 214 transitions between the closed position and the open position. In some examples, an opening of the apertures 334 may include a circular shape, an ovular shape, a polygonal shape and/or any other cross-sectional shape or profile and/or combination thereof. In some examples, a cross-section taken along a longitudinal length (e.g., between the inner surface 318 and the outer surface 320) of the apertures 334 may include a linear shape, a tapered shape, an arcuate shape and/or any other shape and/or combination thereof.

In the illustrated example, the cage 218 is a substantially unitary structure. However, in other example implementations, the cage 218 can be a two-piece cage that includes an upper portion (e.g., defining the first portion 324) that removably couples to a lower portion (e.g., defining the second portion 326). In some such examples, the first portion 324 and the second portion 326 may be coupled together to form the valve seat 216 and the opening 314 along the longitudinal axis 316 to slidably receive the closure member 214. In some such examples, the first portion 324 and/or the second portion 326 may include one or more shoulders to facilitate the precise alignment of the first portion 324 and the second portion 326 of the cage 218 and/or may be dimensioned or have shapes or geometries that result in an interference fit or press fit between the shoulders. In yet other example implementations, the first portion 324 and the second portion 326 of the cage 218 can be coupled via grease, fasteners, or any other suitable fasting mechanism(s). In some examples, the cage of the illustrated example may retrofit control valves in the field and/or may be implemented with off-the-self valve bodies.

Figure 4:
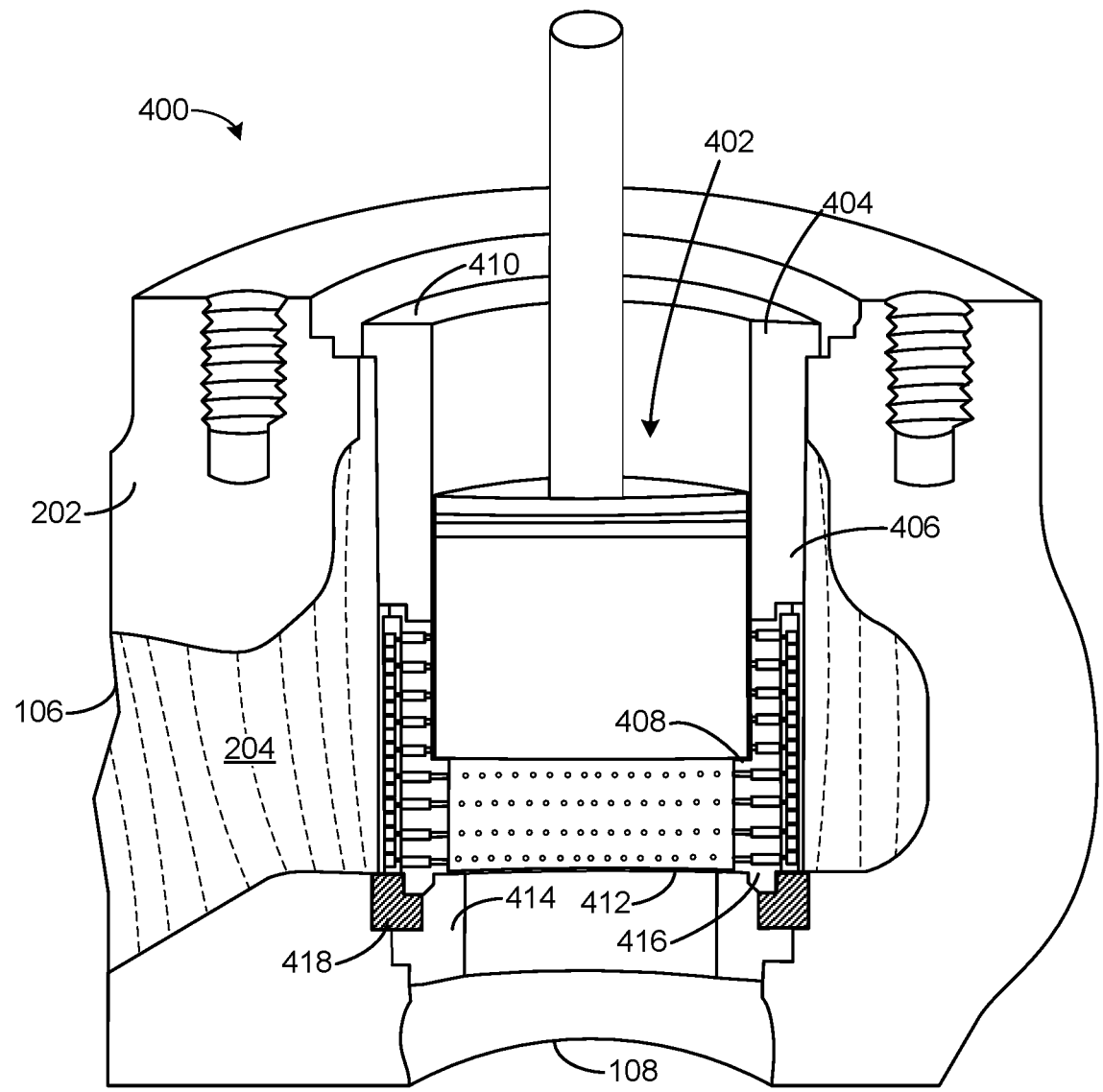
FIG. 4 is a partial, perspective cutaway view of an example control valve having another example valve trim apparatus disclosed herein.

FIG. 4 illustrates a control valve 400 with another example trim apparatus 402 disclosed herein. Those components of the example control valve 400 of FIG. 4 that are substantially similar or identical to the components of the example control valve 102 described above and that have functions substantially similar or identical to the functions of those components will not be described in detail again below. Instead, the interested reader is referred to the above corresponding descriptions. To facilitate this process, similar reference numbers will be used for like structures. For example, the control valve 400 of FIG. 4 includes a valve body 202 having a fluid flow passageway 204 between an inlet 106 and an outlet 108.

The control valve 400 of the illustrated example includes a cage 404. The cage 404, like the cage 218, includes a cage body 406 and a valve seat 408 positioned between a first end 410 of the cage 404 and a second end 412 of the cage 404 (e.g., at or adjacent a midpoint of a longitudinal length of the cage 404). However, the cage 404 of the illustrated example is positioned on a seat ring 414. Specifically, the cage 404 of the illustrated example is positioned between the seat ring 414 and a bonnet. The second end 412 of the cage 404 of the illustrated example includes a lip or protrusion 416 (e.g., an annular lip or protrusion) to engage the seat ring 414. The lip or protrusion 416 facilitates alignment between the cage 404 and the seat ring 414. A retainer 418 may be provided to capture the protrusion 416 between the seat ring 414 and the retainer 418. The cage 404 of the illustrated example may retrofit control valves (e.g., in the field or during manufacturing or assembly of the control valve) that employ the seat ring 414. In some examples, the cage 404 and the seat ring 414 may be dimensioned or have shapes or geometries that result in an interference fit or press fit to couple the cage 404 and the seat ring 414.

Although certain example methods, apparatus and articles of manufacture have been described herein, the scope of coverage of this patent is not limited thereto. Such examples are intended to be non-limiting illustrative examples. On the contrary, this patent covers all methods, apparatus and articles of manufacture fairly falling within the scope of the appended claims either literally or under the doctrine of equivalents.

What is claimed is:

1. A valve trim apparatus for use with a fluid valve comprising:
    a cage to be positioned in a fluid flow passageway of a valve body, the cage having a cage body defining a first end and a second end opposite the first end, the cage having an opening extending through the cage body between the first end and the second end to slidably receive a flow control member, the cage body defining a side wall having a first aperture and a second aperture formed through the side wall; and
    a valve seat positioned in the opening of the cage body between the first aperture and the second aperture of the cage body, the valve trim apparatus to allow fluid flow through the first and second apertures when the fluid valve is an open position, the valve trim apparatus to prevent fluid flow downstream from the valve seat via the first aperture and allow fluid flow downstream from the valve seat via the second aperture when the fluid valve is in a closed position.

2. The apparatus of claim 1, wherein the cage body includes a plurality of apertures in addition to the first aperture and the second aperture formed through the side wall of the cage body.

3. The apparatus of claim 1, wherein the first end of the cage body includes a first dimension and the second end of the cage body includes a second dimension different than the first dimension.

4. The apparatus of claim 3, wherein the first dimension is a first diameter and the second dimension is a second diameter different than the first diameter.

5. The apparatus of claim 1, wherein the opening is formed via a bore and a counterbore.

6. The apparatus of claim 5, wherein the valve seat is formed via a stepped surfaced at an interface between the bore and the counterbore.

7. The apparatus of claim 1, wherein the valve seat is an annular ring positioned on an inner surface of the cage body.

8. The apparatus of claim 1, wherein the first aperture and the second aperture have longitudinal axes that are non-parallel relative to a longitudinal axis of the opening.

9. The apparatus of claim 1, wherein the first aperture is upstream from the valve seat and the second aperture is downstream from the valve seat.

10. The apparatus of claim 1, wherein a first longitudinal axis of the first aperture is offset relative to a second longitudinal axis of the second aperture in a direction along a central axis of the opening.

11. The apparatus of claim 1, wherein the first aperture has a first length along a first longitudinal axis of the first aperture and the second aperture has a second length along a second longitudinal axis of the second aperture, the first length is less than the second length.

12. A valve comprising:
    a valve body defining a fluid flow passageway between an inlet and an outlet, the fluid flow passageway defining an orifice;
    a cage positioned in the fluid flow passageway, the cage having a cage body defining an opening and a valve seat positioned in the opening between a first end of the cage body and a second end of the cage body opposite the first end, the cage including a plurality of first apertures through a side wall of the cage body and a plurality of second apertures through the side wall of the cage body, the valve seat positioned between the first apertures and the second apertures; and
    a valve plug slidably coupled relative to the cage body and movable between an open position at which the valve plug is spaced away from the valve seat and a closed position at which the valve plug is in sealing engagement with the valve seat, the valve plug to modulate fluid flow through the fluid flow passageway via the first apertures of the cage when the valve plug moves between the open position and the closed position, and the valve plug to prevent fluid flow through the first apertures of the cage when the valve plug is in the closed position and the second apertures to allow fluid flow between the inlet and the outlet of the fluid flow passageway when the valve plug is in the closed position.

13. The valve of claim 12, wherein the side wall has an inner surface and an outer surface, the inner surface defined by the opening.

14. The valve of claim 13, wherein each of the first and second apertures has a longitudinal axis that is non-parallel relative to a longitudinal axis of the opening.

15. The valve of claim 14, wherein the second apertures are positioned downstream from the valve seat and the first apertures are positioned upstream from the valve seat.

16. The valve of claim 12, wherein the cage body and the valve seat are integrally formed as a unitary structure.

17. The valve of claim 12, wherein the valve seat is positioned between a midpoint of the cage body and the second end.

18. A valve comprising
    means for defining a fluid flow passageway between an inlet and an outlet;
    means for characterizing fluid flow positioned in the fluid flow passageway between the inlet and the outlet, the means for characterizing fluid flow having means for sealing, the means for characterizing fluid flow having means for throttling fluid flow positioned upstream from the means for sealing and means for providing constant fluid flow positioned downstream from the means for sealing; and
    means for modulating fluid flow to move between an open position and a closed position relative to the means for sealing, the means for modulating fluid flow to allow fluid flow through the means for throttling when the means for modulating is in an open position, the means for modulating fluid flow to prevent fluid flow through the means for throttling when the means for modulating is in the closed position, the means for providing constant fluid flow to allow fluid flow between the inlet and the outlet when the means for modulating is in the closed position.

19. The valve of claim 18, wherein the means for throttling fluid flow includes at least one of means for reducing cavitation or means for attenuating noise.

20. The valve of claim 18, wherein the means for providing the constant fluid flow is to fluidly couple the inlet and the outlet when the means for modulating fluid flow is in the closed position relative to the means for sealing.

* * * * *